July 3, 1923. 1,460,623
V. T. TOBOLLA
COUPLING HEAD AND METHOD OF MAKING SAME
Filed Nov. 11, 1920
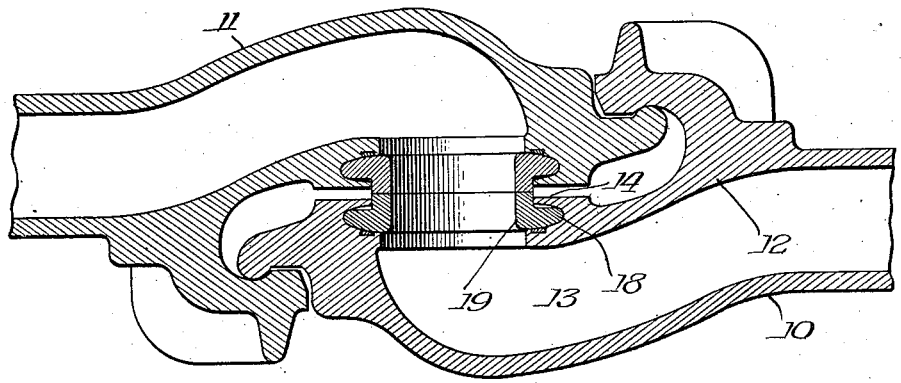
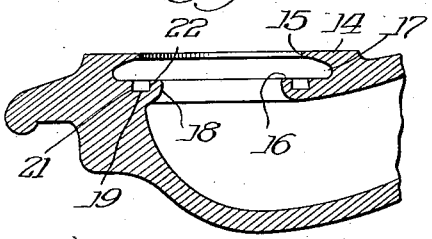 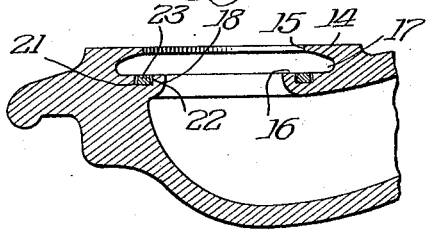
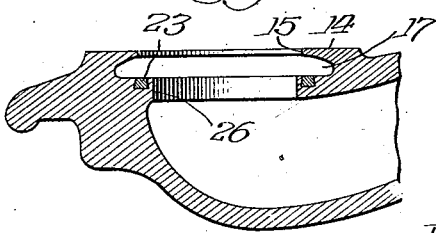 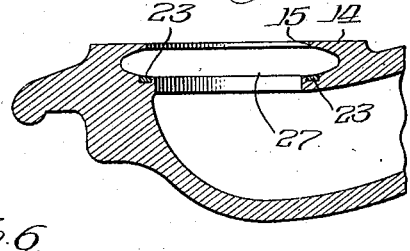
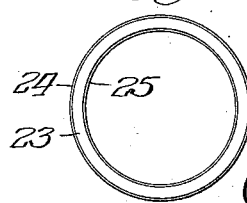
Witness:
Inventor
Victor T. Tobolla
By H G Rockwell Atty.

Patented July 3, 1923.

1,460,623

UNITED STATES PATENT OFFICE.

VICTOR T. TOBOLLA, OF CHICAGO, ILLINOIS, ASSIGNOR TO WILLIAM L. READ AND CHARLES F. READ, BOTH OF CHICAGO, ILLINOIS.

COUPLING HEAD AND METHOD OF MAKING SAME.

Application filed November 11, 1920. Serial No. 423,346.

*To all whom it may concern:*

Be it known that I, VICTOR T. TOBOLLA, a citizen of the United States, residing at Chicago, in the county of Cook and State of Illinois, have invented certain new and useful Improvements in Coupling Heads and Methods of Making Same, of which the following is a specification.

This invention relates to coupling heads for use in connecting train-line, air-hose, steam-lines, and the like, and aims to improve the construction and method of manufacture of coupling heads of this general character.

In order to insure against leakage in coupling heads of the character indicated, it is desirable that the gasket seat be formed partially or wholly of non-corrodible metal which will not pit, corrode, or otherwise deteriorate in use so as to permit leakage around the gasket.

A coupling head equipped with such a non-corrodible gasket seat is disclosed in Patent No. 1,354,904 granted October 5, 1920, the entire seat in this instance being of brass or other similar material which is positioned in the head by being inserted laterally into position through a groove or slot formed in one of the side walls of the head.

One of the primary purposes of my present invention is to provide a coupling head equipped with a non-corrodible gasket seat which will be stronger and more durable than the head disclosed in the patent referred to and which will also be cheaper and easier to manufacture.

Instead, therefore, of forming the gasket seat entirely of brass or other expensive non-corrodible material, my invention contemplates the use of a relatively thin and inexpensive brass ring which forms only a portion of the gasket seat, the remainder of the seating surface being formed by the metal of the head itself. Furthermore, instead of weakening the head by slotting one side of it for the accommodation of the brass seat inserted therethrough, in accordance with the disclosure in the aforementioned patent, my invention contemplates the insertion of the brass ring through the mouth of the port extending through the head, leaving both side walls of the head unimpaired and unweakened. In addition, a coupling head may be manufactured in accordance with my invention considerably cheaper than those of this character which have heretofore been in use.

Other objects and many of the inherent advantages of my invention will be readily appreciated as the same becomes better understood, by reference to the following description when considered in connection with the accompanying drawings:

Referring to the drawings:

Fig. 1 is a longitudinal sectional view of a pair of connected coupling heads embodying my invention;

Figs. 2, 3, 4, and 5 are fragmentary sectional views showing successive steps in the manufacture of the head; and Fig. 6 is a plan view of the gasket seat ring.

Referring now to the drawings more in detail, reference characters 10 and 11 indicate generally a pair of mating coupling heads, a detailed description of one of which will suffice for an understanding of my invention. The body 12 of the head is cast of malleable iron and cored to form an air port 13 extending through the head and terminating centrally of an annular flat face 14 commonly termed the "meeting face" of the head.

The head is formed to provide a mouth 15 at the meeting face end of the port, and a flat seat 16, the internal diameter of which is less than that of the mouth 15, and said seat being spaced inwardly from the mouth and separated therefrom by an annular groove 17 adapted to receive the flange 18 of a rubber gasket 19 which projects upwardly above the surface 14, as shown in Fig. 1. It will be observed from Fig. 2 that the annular surface 16 is substantially flat, and that the port therethrough is of considerably less diameter than that of the mouth 15 and that a rib or flange 18 of metal overhangs to some extent the adjacent metal of the body so that it may be worked or expanded, as will be later explained.

When the head has been thus formed, the surface 16 is then operated upon by a tool to produce a groove 19 therein, the outer wall 21 of which is slightly undercut while the inner wall 22 is substantially vertical, all as shown in Fig. 2. The outer diameter of this groove is slightly greater than the diameter of the mouth 15, while the inner diameter is somewhat less, as will be apparent from this figure.

After this groove has been formed, a metal ring 23, preferably of brass or if preferred, of other non-corrodible metal, is seated in the groove. This ring is continuous, its side walls 24 and 25 tapering outwardly slightly from top to bottom substantially at the same angle as the angle of inclination of the groove wall 21. This ring being slightly larger in external diameter than the mouth 15 is compressed from opposite sides and thereby elongated sufficiently to permit its introduction through the mouth 15 whereupon the resiliency of the metal of which the ring is composed returns the ring to truly circular form, permitting it to be dropped into the groove 19, as shown in Fig. 3. When the ring is thus loosely positioned in the seat, a slight clearance is left between the outer inclined edge 24 of the ring and the outer inclined wall of the groove, likewise a slight clearance occurs between the vertical wall 22 of the groove and the inclined inner face 25 of the ring.

For the purpose of firmly anchoring the ring in the metal in which it is now loosely embedded, an expanding tool is inserted through the mouth 15 within the internal annular flange 18, whereupon by operation of this tool, the metal of the flange 18 is upset and forced outwardly, thereby causing the vertical wall 32 of the groove to be displaced into inclined position and the ring 23 to be slightly expanded into snug relation with the undercut wall 21, with the result that the ring is now firmly anchored in the groove by the overlying upright walls thereof which snugly engage the tapered edges 24 and 25 of the ring. This operation also enlarges somewhat the diameter of the opening beneath the gasket ring seat and makes the walls thereof substantially perpendicular, as indicated at 26 in Fig. 4. If these walls 26 are not sufficiently smooth after the expanding operation, they may be reamed slightly, if necessary.

The ring 23 is now firmly anchored and embedded in the surrounding metal of the body, and as will be manifest, is completely surrounded circumferentially by the metal of the body, the side walls of which are intact and unimpaired or weakened by any slotting or cutting, such as has heretofore been considered necessary.

The surface 16 and the upper surface of the ring 23 are now milled to provide a downward and inward inclination, thus forming the completed seat 27 for the gasket ring, which seat is composed of the metal of the body and the upper surface of the ring 23, which is milled flush with the surface of the surrounding body metal as shown in Fig. 5. The rubber gasket 19 is now introduced into the seat, thus completing the formation of the head.

Normally, the flange 18 of the rubber gasket extends at right angles from the cylindrical portion thereof, its outer periphery being engaged in the groove 17 of the head and its bottom extending substantially horizontally and therefore slightly above the inclined seat 27. When two heads are coupled together, the gasket rings are placed under compression, thereby forcing the gaskets into snug engagement with the tapered seats as shown in Fig. 1, so as to form an air and liquid-tight seal which prevents leakage at the joint. Water, steam or other matter which may pass through or collect in the heads tend to cause pitting and corroding of the cast metal of which the heads are composed, but the non-corrodible ring 23 embedded in and forming a part of the gasket seat is not affected by the substances, and therefore insures and maintains a smooth, permanent gasket seat which effectually precludes leakage and maintains a tight joint even after prolonged usage.

It is believed that a coupling head embodying my invention, its method of manufacture and many of its inherent advantages will be understood and appreciated from the foregoing without further description, but it should be manifest that the details of construction of the head and the steps followed in its production may be varied within considerable limits without departing from the essence of the invention as defined in the following claims.

I claim:

1. A coupling head, comprising a body having a port extending therethrough and surrounded by an annular gasket seat, said seat including a ring of non-corrodible metal embedded in and having its inner and outer circumference embraced by the metal of said body.

2. A coupling head, comprising a body provided with a port extending therethrough, and a seat surrounding said port, the face of said seat being formed by the metal of said body and a ring of non-corrodible metal embedded therein, said ring being entirely surrounded by the metal of the body and the gasket when assembled.

3. A coupling head, comprising a body provided with a port extending therethrough, an annular gasket seat surrounding said port within the body, and a ring of non-corrodible metal anchored in said seat and having its inner and outer circumference embraced by the metal thereof.

4. A coupling head, comprising a body provided with a port extending therethrough, an annular gasket seat surrounding said port, and a ring of non-corrodible metal embedded in the face of the seat with its upper face flush with and forming part of said seat, said ring having its inner and outer circumference embraced by the metal of said body.

5. A coupling head, comprising a metal body provided with a port extending therethrough and forming an annular gasket seat surrounding said port within said body, and a transversely tapered ring of non-corrodible metal embedded in and forming part of said seat and anchored in position by having its inner and outer circumference embraced by the metal of said seat.

6. A coupling head, comprising a metal body provided with a port extending therethrough and forming an annular gasket seat surrounding said port and spaced from the mouth thereof, said seat being inclined relatively to the axis of said port and provided with an annular ring of non-corrodible metal embedded in the metal of said body with its upper face flush with and forming a part of said inclined portion of the seat said ring being entirely surrounded by the metal of the body and the gasket when assembled.

7. The method of making coupling heads which consists in, anchoring in the gasket seat formed by the metal of the head around the port therethrough, a ring of non-corrodible metal positioned with its upper surface exposed substantially flush with the surrounding metal of the seat and its inner and outer perimeters embraced by the metal of said body.

8. The method of making coupling heads which consists in providing an upwardly opening annular groove in the gasket seat of the head remote from the mouth of the port therethrough introducing a ring of non-corrodible metal through said mouth into said groove, and anchoring said ring in the groove.

9. The method of making coupling heads which consists in, forming a groove in the body of the head remote from the mouth of the port therethrough, introducing a ring of non-corrodible metal through said mouth into said groove, and upsetting the metal of the head in proximity to said ring to anchor the ring in position.

10. The method of making coupling heads which consists, in providing an inclined gasket seat within the body of a head remote from the mouth of the port extending through said head and incorporating in said seat an annular ring of non-corridible metal having its exposed upper bearing surface disposed flush with the surrounding metal of the seat.

11. The method of making coupling heads which consists in, forming an undercut annular groove in a gasket seat surface disposed within the body of the head, introducing into said groove through the mouth of the port extending through the head, a transversely tapered ring of non-corrodible metal and reducing the width of said groove to anchor said ring therein.

12. The method of forming coupling heads which consists in, forming an annular groove in the body of the head remote from the mouth of the port extending therethrough, introducing a non-corrodible ring of greater diameter than the mouth through said mouth into said groove, upsetting the metal of the body to anchor said ring in the groove, and finishing the upper surface of said ring and the adjacent body metal to provide an inclined gasket seat in which said ring is incorporated.

VICTOR T. TOBOLLA.